2,940,859
METHOD OF PREPARING ALIMENTARY LACTIC YEASTS

Yves Georges Vrignaud, Meudon, France, assignor to Fromageries Bel La Vache Qui Rit, Paris, France, a company No Drawing. Filed June 18, 1956, Ser. No. 592,217

Claims priority, application France June 22, 1955

8 Claims. (Cl. 99—96)

The present invention relates to the preparation of burst alimentary yeasts from lactic serums such as cheesemongery serums, casein factory serums or serum-buttermilk mixtures.

The main object of the present invention is to provide a method of preparing burst alimentary lactic yeasts which consists in precipitating the fermentable nitrogenous substances, i.e. proteins and albumin, contained in a lactic serum from the group comprising cheesemongery serums, casein factory serums and serum-buttermilk mixtures, separating the precipitated substances from the thus de-proteinized lactic serum, and simultaneously absorbing and transforming by means of yeasts the carbohydrates existing in said de-proteinized lactic serum.

According to an advantageous embodiment of this invention the serums are de-proteinized through a flocculation process followed by a decantation and a filtration. Preferably the flocculation is carried out by adding lactic acid to the serum or serum-buttermilk mixture heated beforehand to 80° C. until the pH thereof ranges between 4.5 and 4.7, the resulting mixture being subsequently heated to a temperature ranging between 92° C. and 94° C. during 5 minutes. The clear liquid obtained after filtration is advantageously utilized for re-heating a fresh serum or a fresh serum-buttermilk mixture to 80° C.

According to another advantageous embodiment of the method broadly set forth hereinabove, the carbohydrates from the serum or de-proteinized mixture are absorbed and transformed by the action of yeasts by fermenting the serum or de-proteinized mixture enriched beforehand with nutritive salts, this fermentation being conducted by using a leaven comprising a biological association of two or three stocks of suitably selected Saccharomyces to a concentration of at least 700 million cells per cc.; on the other hand, this fermentation is conducted at a very low pH value, of the order of 2.5 to 2.8 and at a temperature ranging between 25° and 28° C. with an aeration of the order of from 300 to 400 cubic-meters per hour for 350 kilograms of yeast pressed in a vat, this fermentation being followed by an extraction of the yeast-containing liquor after having allowed the mixture to rest one hour with a moderate aeration of from 150 to 200 cubic-meters per hour, whereafter the yeast is separated from the effluent, the resulting concentrated yeast milk being finally dried.

The nutritive salts by which the de-proteinized serum is enriched comprise ammonium sulfate, ammonium phosphate, potassium hydroxide and similar substances. Preferably, the fermentation is carried out by biologically associating three Saccharomyces stocks such as:

Saccharomyces lactis
Saccharomyces lactis Dombrowski
Saccharomyces fragilis Jörgensen or Saccharomyces lactis Dombrowski
Saccharomyces fragilis Jörgensen
Candida pseudo tropicalis The combined use of two or three of these stocks may be effected in any desired order and will provide high growth yields.

The growth is made with a very high yeast concentration of the order of from 65 to 95 grams per litre, the yeast weight being expressed for pressed yeast with a 75% moisture content. This represents from $1.3 \times 10^9$ to $2 \times 10^9$ cells per cc. or more, for the numeration is subordinate to the size of the cells.

The fermentation may take in liquors having a very variable lactose concentration, e.g. from a maximum of 100 grams per litre to less than 5 grams per litre, in other words, the method is characterized by a high degree of flexibility as regards the working possibilities.

The following example given by way of illustration will afford a clear understanding of the manner in which the method of this invention may be carried out in the practice, the specific features of the process described forming part, of course, of the invention.

The serum delivered from the cheesemongery is immediately de-proteinized. To this end it is heated in a heat-exchanger up to 80° C. and subsequently fed to a vat having a tapered bottom in which lactic acid is added to the serum to bring its pH to a value ranging from 4.5 to 4.7; then the temperature is raised as rapidly as possibly to between 92° and 94° C. and kept during five minutes at this value.

The proteins and albumin of the flocculating serum decant, the clear liquid is extracted and fed to a storage vat, preferably through the medium of the heat exchanger where it heats the incoming or fresh serum.

The protein milk is dried on cylinders or by atomization.

The fermentation vat system comprises at least two vats. The first vat receives the leaven prepared separately and having a volume equal to or greater than one-fifth of the permissible capacity of fermentable liquid. A 30,000 litre vat having a working capacity of 25,000 litres is fed with 5,000 litres of leaven containing at least 700 million cells per cc.

On these 5,000 litres of leaven the de-proteinized serum previously enriched with nutritive salts (ammonium sulfate, ammonium phosphate, potash, etc.) is poured at the rate of 200 litres/hour while ensuring an adequate aeration rating 300 cubic-meters per hour. The yeast concentration increases rapidly and in parallel with the quantities of serum thus poured.

These vats are kept at a temperature ranging between 25 and 28° C. throughout the fermentation process.

When the 30,000-litre vat contains 25,000 litres of fermentation liquid the cellular concentration is of from $1.5 \times 10^9$ to $2 \times 10^9$ cells per cc., that is a weight of 65 to 75 grams of leaven having a moisture content ranging from 72 to 75%, and in this case the pouring is effected at the rate of from 600 to 700 litres per hour with an aeration of from 500 to 600 cubic meters per hour The fermenting liquid will then flow through the overflow pipe or siphon system to the second vat from which it can be extracted progressively after a one-hour stay while aerating at a moderate rate, for example from 150 to 250 cubic meters per hour, according to the volume of this second vat.

From this vat the yeast-containing liquor is delivered to a centrifugal separator equipped with a continuous washing system, whereby the yeasts are separated from the effluent, the latter being fed to the sewer system.

The concentrated yeast milk is subsequently washed with a salt-water solution containing 5 grams per litre of sodium chloride or potassium chloride; the washing is effected at the rate of two volumetric parts of salt water per volumetric part of yeast milk. The purpose of this salt-water washing operation is to avoid the plasmolysis of cells which is likely to occasionate losses of yield.

The concentrated and washed yeast milk is then dried on sludge or soaking cylinder drying apparatus in order to burst or shatter the yeast cells.

Of course, the number of fermentation vats or their arrangement may vary at will without departing from the spirit and scope of the invention.

When assaying a batch of alimentary lactic yeasts obtained through the manufacturing method described hereinabove and wherein the fermentation process is carried out in a liquor having a lactose concentration ranging from 30 to 50 grams per litre, the following physical properties and contents of chemicals are observed, the lactose concentration corresponding to that of the first and second serums of pressed-paste cheeses such as those known under the name of Saint-Paulin, Edam, etc.:

| | |
|---|---|
| Moisture content (in grams per 100 grams) | 5 |
| Weight when dry (in grams) | 95 |
| Acidity (expressed in sulfuric acid) | 0.8 |
| Total nitrogen content of the product | 7.5 |
| Total content of water-soluble nitrogen | 0.98 |
| Water-soluble aminated nitrogen | 0.18 |
| Total protein content | 46.87 |

For 100 of the total proteins

| | |
|---|---|
| Arginine | 4.85 |
| Histidine | 2.25 |
| Lysine | 6.95 |
| Tyrosine | 4.05 |
| Tryptophan | 1.35 |
| Methionine | 1.40 |
| Phenylalanine | 4.10 |
| Cystine | 1.20 |
| Ergosterol (mg. per 100 grams) | 0.51 |
| Vitamin $B_1$ (mg. per 100 grams) | 1.7 |
| Vitamin $B_2$ (mg. per 100 grams) | 4.32 |
| Thiamine: | |
|   Fluorometry | 1.57 |
|   Microbiology | 2.14 |
| Riboflavine—microbiology | 6.18 |
| Niacine—microbiology | 38.2 |
| Pyridoxine—microbiology | 2.18 |
| Pantothenic acid—microbiology | 16.45 |
| Biotine—microbiology | 0.18 |
| Vitamin $B_{12}$ (mg. per 100 grams) | 0.0075 |
| Vitamin PP (mg. per 100 grams) | 8.3 |
| Ashes (g. per 100 g.) | 8 |
| Calcium (mg. per 100 g.) | 632 |
| Phosphorus (g. per 100 g.) | 1.85 |
| Nucleic phosphorus (g. per 100 g.) | 1.99 |
| Sulphur (mg. per 100 g.) | 370 |

It may be pointed out that the quantities of air utilized for carrying out the method of this invention are considerably inferior to those required for similar manufacturing processes, especially if due regard is paid to the above-indicated high cellular densities.

The method of manufacturing alimentary lactic yeast according to this invention is characterized by a high degree of safety whereby a particularly fermentable liquid can be treated without taking excessive care. With this method valuable food products can be obtained which are of high nutritive value and therefore sell well; this applies firstly to lacto-proteins and then to burst alimentary lactic yeasts.

Due to their species and also to the substratum on which they have been developed these yeasts are of high quality as regards both their protein percentage and their vitamin content and amino acids content.

These alimentary lactic yeasts may also be utilized in view of extracting vitamins, amino acids and antibiotics for preparing pharmaceutical miscellaneous drugs.

Moreover, with this manufacturing process first-quality yeasts can be obtained with high and constant yields. In no cases the yields of dried yeasts having a 5% moisture content are lower than 50% of the initial lactose weight. Practical experience shows that the figure of 55% is currently obtained and in very favourable cases this figure may even attain from 60 to 55%. These high yields are not obtained at the expense of the chemical composition of the yeasts, particularly of the content of total protein substances which in no case is lower than 42%.

The vat capacity required for carrying out the method of this invention is moderate with respect to the known processes because the fermentation is effected continuously with a high sugar content and a maximum yeast concentration.

Thus, in vats representing a 90,000-litre capacity and a useful volume of 60,000 litres, 80,000 litres of serum are fermented in 24 hours, irrespective of the carbohydrate content of the serum, by varying only the volume of blown air and the quantities of enriching nutritive salts.

This method also constitutes a method of cleaning the cheesemongery effluents. When all the fermentable substances contained in the cheesemongery serums have been removed, these are unable to occasionate any serious inconveniences in the water streams and at any rate can be easily treated in a refining installation of the town-waste treatment installation type.

The B.O.D. 5 or biochemical oxygen requirement for five days of a first raw serum ranges from 6,000 to 7,000. The corresponding demand for the effluents of serum yeast-making just after the yeast extraction and without any dilution is 500 to 700. These effluents do not contain any toxic substance capable of destroying the sub-aqueous life.

It will be readily understood that many modifications and alterations may be brought to the present invention without departing from the scope thereof as defined by the appended claims.

What I claim is:

1. A method of preparing burst alimentary lactic yeasts from a lactic serum selected from the group consisting of cheese factory serums, casein factory serums and serum-buttermilk mixtures, which has been previously de-proteinized by adding lactic acid to the lactic serum heated beforehand to 80° C. until the pH of the mixture ranges from 4.5 to 4.7, heating the thus obtained mixture during 5 minutes to a temperature ranging between 92° C. and 94° C., and separating the precipitated substances from the thus de-proteinized lactic serum, which method consists in simultaneously absorbing and transforming the carbohydrates existing in said de-proteinized lactic serum by a fermentation conducted by using a leaven comprising a biological association of at least two and at the most three stocks of Saccharomyces from the group consisting of *Saccharomyces lactis*, *Saccharomyces lactis* Dombrowski, *Saccharomyces fragilis* Jörgensen and *Candida pseudo tropicalis*, drying the thus prepared yeast and simultaneously causing the cells of said yeast to burst.

2. A method according to claim 1, wherein the clear liquid obtained after filtration is utilized to heat beforehand another lactic serum to 80° C.

3. A method of preparing burst alimentary lactic yeasts which consists in heating beforehand to 80° C. a lactic serum from the group consisting of cheese factory serums, casein factory serums and serum-buttermilk mixtures, adding lactic acid to the heated lactic serum until the pH of the mixture ranges from 4.5 to 4.7, heating the thus obtained mixture for 5 minutes to a temperature ranging between 92° C. and 94° C., in order to de-proteinize said lactic serum, separating the precipitated substances from the thus de-proteinized lactic serum, simultaneously absorbing and transforming the carbohydrates existing in said de-proteinized lactic serum by means of a leaven comprising a biological association of at least two and at the most three stocks of Saccharomyces from the group consisting of *Saccharomyces lactis*, *Saccharomyces lactis* Dombrowski, *Sac-*

*charomyces fragilis* Jörgensen and *Candida pseudo tropicalis*, which simultaneous absorption and transformation consist in enriching the de-proteinized lactic serum with nutritive salts, causing said enriched de-proteinized lactic serum to ferment by means of a leaven comprising said yeast stocks having an initial concentration of at least 700 million cells per cc., this fermentation being conducted under a very moderate pH of the order of from 2.5 to 2.8 and at a temperature ranging from 25° C. to 28° C., aerating the fermenting mixture at a rate ranging from 300 to 400 cubic-meters per hour for 350 kilograms of yeasts pressed in a vat, causing the mixture obtained after fermentation to rest about one hour, aerating said mixture at rest at a moderate rate ranging from 150 to 200 cubic-meters per hour, extracting the yeast-containing liquor from said rested mixture, separating the yeasts from the effluent in said yeast-containing liquor, drying the thus prepared yeast and simultaneously causing the cells of said yeast to burst.

4. A method according to claim 3, wherein the fermentation of the yeasts is conducted with a very high yeast concentration of the order of from 65 to 95 grams per litre, the weight being expressed as pressed yeasts having a 75% moisture content.

5. A method according to claim 3, wherein the fermentation is effected in liquors having a lactose concentration varying from a maximum of 100 grams to less than 5 grams per litre.

6. A method according to claim 3, wherein the concentration yeasts are washed with a salt-water solution containing 5 grams per litre of alkaline chloride, the washing step being effected at the rate of two volumes of salt-water per volume of yeast.

7. A method according to claim 3, wherein the yeasts concentrated after separating the effluent and washed are subsequently dried on cylinder drying apparatus in order to burst the yeast cells.

8. A method of preparing burst alimentary lactic yeast from a lactic serum selected from the group consisting of cheese factory serums, casein factory serums and serum-buttermilk mixtures, which has been previously deproteinized by adding lactic acid to the lactic serum heated beforehand to 80° C. until the pH of the mixture ranges from 4.5 to 4.7, heating the thus obtained mixture during 5 minutes to a temperature ranging between 92° C. and 94° C., and separating the precipitated substances from the thus de-proteinized lactic serum, which method consists in simultaneously absorbing and transforming the carbohydrates existing in said de-proteinized lactic serum by a fermentation conducted by using a leaven comprising a biological association of at least two and at the most three stocks of Saccharomyces from the group consisting of *Saccharomyces lactis*, *Saccharomyces lactis* Dombrowski, *Saccharomyces fragilis* Jörgensen and *Candida pseudo tropicalis*, which simultaneous absorption and transformation consist in enriching the de-proteinized lactic serum with nutritive salts, causing said enriched de-proteinized lactic serum to ferment by means of a leaven comprising said yeast stocks having an initial concentration of at least 700 million cells per cc., this fermentation being conducted under a very moderate pH of the order of from 2.5 to 2.8 and at a temperature ranging from 25° C. to 28° C., aerating the fermenting mixture at a rate ranging from 300 to 400 cubic-meters per hour for 350 kilograms of yeasts pressed in a vat, causing the mixture obtained after fermentation to rest about one hour, aerating said mixture at rest at a moderate rate ranging from 150 to 200 cubic-meters per hour, extracting the yeast-containing liquor from said rested mixture, separating the yeasts from the effluent in said yeast-containing liquor, drying the thus prepared yeast and simultaneously causing the cells of said yeast to burst.

References Cited in the file of this patent

UNITED STATES PATENTS

| | | |
|---|---|---|
| 2,351,970 | Jansen | June 20, 1944 |
| 2,465,870 | Hanson et al. | Mar. 29, 1949 |
| 2,809,113 | Stimpson et al. | Oct. 8, 1957 |

OTHER REFERENCES

"J. Inst. Brewing," Dec. 1939, p. 617.